US006526420B2

(12) United States Patent
Borowsky et al.

(10) Patent No.: US 6,526,420 B2
(45) Date of Patent: *Feb. 25, 2003

(54) NON-LINEAR CONSTRAINT OPTIMIZATION IN STORAGE SYSTEM CONFIGURATION

(75) Inventors: Elizabeth Borowsky, San Francisco, CA (US); Pat Jacobson, Santa Clara, CA (US); Arif Merchant, Los Altos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/988,000

(22) Filed: Nov. 16, 2001

(65) Prior Publication Data

US 2002/0046316 A1 Apr. 18, 2002

Related U.S. Application Data

(63) Continuation of application No. 09/197,114, filed on Nov. 20, 1998.

(51) Int. Cl.⁷ .............................................. G06F 17/30
(52) U.S. Cl. ........................... 707/205; 706/19; 706/46
(58) Field of Search ................................ 707/200, 205; 706/19, 46; 711/170, 158, 171, 172; 709/105

(56) References Cited

U.S. PATENT DOCUMENTS

| 5,014,197 A | * | 5/1991 | Wolf ............................ 710/38 |
| 5,428,712 A | * | 6/1995 | Elad et al. ..................... 706/10 |
| 6,031,984 A | * | 2/2000 | Walser ........................... 703/2 |
| 6,321,317 B1 | * | 11/2001 | Borowsky et al. ........... 711/158 |
| 6,366,931 B1 | * | 4/2002 | Borowsky et al. .............. 703/2 |

FOREIGN PATENT DOCUMENTS

EP           0356773 A2  *  7/1990  ............. G06F/9/46

OTHER PUBLICATIONS

Shriver, Elizabeth, "Performance Modeling for Realistic Storage Devices", A dissertation for the degree of Doctor of Philosophy Department of Computer Science. New York University, May 1997, pp. 1–298.*
Borowsky et al. "Using attribute–manage Storage to Achieve QoS", Proceedings of the 5th International Workshop on Quality o Service. Jun. 1997, pp. 1–4.*
Tanaka et al., "Distributed Architechture for Large–scale Video Server", Proceedings of International Conference on Information Communication, Sep. 1997, pp. 578–583.*
Lau et al. "The Guided Genetic Algorithm and its Application to the Generalized Assignment Problem", Proceeding of International Conference on Tols with Artificial Interligent. Nov. 1998, pp. 336–343.*
Trivedi et al. , "Optimal Selection of CPU Speed, Device Capacities, and File Assignments", Journal of the ACM vol. 27, issue 3, Jul. 1980, pp. 457–473.*
Wagner et al., "Hardware Configuration Selection Through Discretizing a Continuous Variable Solution", Proceeding of the 198 ISCPMME. Toronto, Canada, pp. 127–142.*
Dowdy et al. "Comparative Models of the File Assignment Problem", Computing Surveys, vol. 14, No. 2, Jun. 1982, pp. 288 313.*
Wolf, J, "The placement Optimization Program: a Practical Solution to the Disk File Assignment Problem", ACM Sigmetric, 1989, Oakland, California, pp. 1–10.*

* cited by examiner

Primary Examiner—Jean R. Homere
Assistant Examiner—Khanh Pham

(57) ABSTRACT

An apparatus for and a method of non-linear constraint optimization in a storage system configuration. In accordance with the primary aspect of the present invention, the objective function for a storage system is determined, the workload units are selected and their standards are determined, and the storage devices are selected and their characteristics are determined. These selections and determinations are then used by a constraint based solver through non-linear constraint integer optimization to generate an assignment plan for the workload units to the storage devices.

2 Claims, 1 Drawing Sheet

NON-LINEAR CONSTRAINT OPTIMIZATION IN STORAGE SYSTEM CONFIGURATION

CROSS REFERENCE TO RELATED APPLICATION(S)

This is a continuation of copending application Ser. No. 09/197,114 filed on Nov. 20, 1998, which is hereby incorporated by reference herein.

RELATED APPLICATION

This application is a continuation of Ser. No. 09/197,114, filed on Nov. 20, 1998.

BACKGROUND OF THE INVENTION

1. Field of the Invention

The present invention relates generally to computer storage systems and pertains more particularly to an apparatus for and a method of non-linear constraint optimization in a storage system configuration.

2. Discussion of the Prior Art

Storage systems for computer networks can contain a large number of storage devices having a wide variety of characteristics and a nearly arbitrary interconnection scheme. The configuration and management of the storage system is central to the functioning of the computer network. In very large networks, the inherent difficulties in configuring and managing the storage system are compounded by the sheer scale of the network. The situation has reached the point where the time needed to configure a new storage system can be several months and the cost of managing the storage system can be several times the purchase cost.

Large computer networks can contain a large number of host computers connected to the storage system. In such networks, many application programs may be running concurrently on one or more of the host computers and each application program has a certain level of service that it requires from the storage system in order to run well. The storage allocation problem is to optimally lay out data accessed by the application programs on the optimal set of storage devices in the storage system. A solution to the problem is referred to as an assignment plan.

The optimality of the resulting overall assignment plan is evaluated based on an objective function. For example, an objective function may be to minimize the cost of the storage system. An objective function may be to maximize the performance of the storage system. Other objective functions include balancing the load, maximizing the availability, and minimizing the physical footprint. One of ordinary skill in the art will realize that there are many other possible objective functions and that, often, multiple and competing objective functions will have to be balanced.

A specific piece of data is referred to as a workload unit. Associated with every workload unit are a set of standards. Standards include both the workload unit characteristics and the application program access characteristics. For example, a standard may be the size of the workload unit. A standard may be the access speed or the access frequency of the application program. Other standards include request size, request rate, run count, phasing behavior, on time, off time, and maximum amount of data loss. One of ordinary skill in the art will realize that there are many other possible standards.

Likewise, associated with every storage device are a set of characteristics. Characteristics include both performance measures and physical descriptions. For example, a characteristic may be the quantity of storage available on or the access speed of the storage device. A characteristic may be the size or the weight of the storage device. Other characteristics include position time, transfer rate, cost, outage frequency, outage length, and data loss rate. One of ordinary skill in the art will realize that there are many other possible characteristics.

For the storage allocation problem, the questions of whether the various workload unit standards are compatible with the various storage device characteristics serve as constraints on the solution. Often, the constraints are linear inequalities, that is, expressions of the form $$\sum_{w_i \in W} a_i w_i < f(d) \qquad \text{Eq. (1)}$$

where the values of $a_i$ and $f(d)$ are constants for a given storage device, for example, quantity of storage, outage frequency, and data loss rate. However, some of the constraints are non-linear, for example, access speed and utilization. Further, some of the constraints are not inequalities, for example, existence of proper interconnect cabling. This mixture of constraints serves to further complicate the matter because if one could assume that all of the constraints were of one type, then one could tailor the solution to that type of constraint. In particular, there are a number of good solutions if the constraints were all linear. Unfortunately, that is not necessarily the case here.

So, the storage allocation problem can be viewed on at least two levels. First, whether a particular workload unit can be assigned to a particular storage device, that is, whether the constraints are met. Second, whether a particular workload unit should be assigned to a particular storage device given the resulting overall assignment plan, that is, whether the objective function is optimized.

There exist many standard optimization problems that are similarly structured to the storage allocation problem. However, none of them are an exact match. As a result, none of them provide a model upon which to reach a solution.

One standard optimization problem similar to the storage allocation problem is the classic bin packing problem. In the classic bin packing problem, the challenge is to fit a set of n items, $I=\{i_1, i_2, \ldots i_n\}$, having fixed sizes, $S=\{s_1, s_2, \ldots s_n\}$, into a set of m bins, $B=\{b_1, b_2, \ldots b_m\}$, having fixed capacities, $C=\{c_1, c_2, \ldots c_m\}$. The objective function is to use the minimum number of bins possible given the constraint that the sum of the sizes of a set of items in a bin must be less then or equal to the capacity of the bin. So, in the classic bin packing problem, there is only one objective function and one constraint. In the storage allocation problem, however, there may be multiple objective functions and multiple constraints. As a result, solutions to the classic bin packing problem cannot be used directly to solve the storage allocation problem.

Another standard optimization problem similar to the storage allocation problem is the integer knapsack problem. In the integer knapsack problem, the challenge is to fit a set of n items, $I=\{i_1, i_2, \ldots i_n\}$, having a fixed size, $S=\{s_1, s_2, \ldots s_n\}$, and a defined value, $V=\{v_1, v_2, \ldots v_n\}$, into a knapsack having a fixed size k. The objective function is to maximize the value of a set of items placed into the knapsack given the constraint that the sum of the sizes of the set of items in the knapsack must be less then or equal to the capacity of the knapsack. Again, in the integer knapsack problem, there is only one objective function and one constraint. Alternatively, there is a variant of the integer knapsack problem called the multidimensional knapsack problem which takes into account multiple capacity dimensions. An example solution is given in MANAGEMENT SCIENCE by Yoshiaki Toyoda (Toyoda) in an article entitled "A Simplified Algorithm for Obtaining Approximate Solutions to Zero-One Programming Problems." Even so, both of the knapsack problems differ from the storage allocation problem in two significant ways. First, the knapsack problems assume that the capacity dimensions can be captured as linear constraints. However, as noted above, this may not always be the case in the storage allocation problem and cannot be assumed. Second, the knapsack problems assume a fixed number of knapsacks. However, in the storage allocation problem, an objective function to choose the best set of storage devices may require that storage devices be added or that storage devices remain unused. As a result, solutions to the knapsack problems cannot be used directly to solve the storage allocation problem.

One computer specific optimization problem similar to the storage allocation problem is the standard file allocation problem. In the standard file allocation problem, the challenge is to place a set of n files, $F=\{f_1, f_2, \ldots f_n\}$, having a fixed size, $S=\{s_1, s_2, \ldots s_n\}$ and a set of m tasks, $T=\{t_1, t_2, \ldots t_m\}$, onto a set of k nodes, $N=\{n_1, n_2, \ldots n_k\}$, having a fixed capacity, $C=\{c_1, c_2, \ldots c_k\}$, where each task needs to access at least one file and each file is accessed by at least one task. The objective function is to minimize the file transmission costs of running the tasks given the constraint that the sum of the sizes of a set of files on a node must be less then or equal to the capacity of the node. Again, in the standard file allocation problem, there is only one objective function. Alternatively, there are a number of variants of the standard file allocation problem. Even so, all of the file allocation problems differ from the storage allocation problem in that they assume a fixed number of nodes. However, in the storage allocation problem, an objective function to choose the best set of storage devices may require that storage devices be added or that storage devices remain unused. As a result, solutions to the file allocation problems cannot be used directly to solve the storage allocation problem.

In addition to the above optimization problems, a number of narrow solutions have been proposed to address individual aspects of the problem. An example of a narrow solution is presented in U.S. Pat. No. 5,345,584 issued to Hill entitled "System for Managing Data Storage Based on Vector-Summed Size-Frequency Vectors for Data Sets, Devices, and Residual Storage on Devices." This patent discloses a method that only considers the capacity and access speed of the storage device. Generally, all of the narrow solutions fail to provide a method for using arbitrary constraints or arbitrary objective functions.

Given the preceding state of the art, it is not surprising to find that configuration and management of the storage system has historically been accomplished through ad hoc solutions to the storage allocation problem. A formalization of the storage allocation problem and a collection of a range of solutions would be a significant advancement.

SUMMARY OF THE INVENTION

It is a primary purpose of the present invention to provide an improved apparatus for and method of non-linear constraint optimization in a storage system configuration.

In accordance with the primary aspect of the present invention, the objective function for a storage system is determined, the workload units are selected and their standards are determined, and the storage devices are selected and their characteristics are determined. These selections and determinations are then used by a constraint based solver through non-linear constraint integer optimization to generate an assignment plan for the workload units to the storage devices.

BRIEF DESCRIPTION OF THE DRAWING

The above and other objects and advantages of the present invention will be appreciated from the following detailed description when read in conjunction with the accompanying drawing, wherein.

DETAILED DESCRIPTION OF THE PREFERRED EMBODIMENTS

The purpose of the present invention is to provide a formalization of the storage allocation problem and a collection of a range of solutions. The storage allocation problem is referred to as being NP-hard, which means that there is currently no known way of finding a provably optimal solution without checking every possible solution. Generally this is not practical or necessary. The present invention discloses an apparatus and a method that reach a good, generally acceptable, approximate solution in a relatively short amount of time.

The present invention formalizes the storage allocation problem as a non-linear constraint integer programming problem. In this way one can apply results from a wide body of research on integer programming and optimization. This body of research gives one insight into such problems as well as a large body of heuristics that can give good, though not provably optimal, solutions to the problem.

In the generalized storage allocation problem, one is given a set of n workload units, $W=\{w_1, w_2, \ldots w_n\}$, a set of m storage devices, $D=\{d_1, d_2, \ldots d_m\}$ and a set of k constraints, $C=\{c_1, c_2, \ldots c_k\}$. Recall that the constraints determine if a set of workload units can be assigned to a given storage device based on the standards of the workload units and the characteristics of the storage device. In its most general form, a constraint $C_i$ is simply a function derived from a set of workload units and a storage device that determines a result from the set {true, false}. It may be said that a constraint $C_i$ is satisfied for a set of workload units W and a storage device d if the function $C_i(W,d)$ is true. It may be said that an assignment of a subset of workload units $W_d$ to a storage device d is feasible if, for all constraints $C_i$ in the set of constraints $C_i$ the function $C_i(W_d,d)$ is true. Recall also that the optimality of the resulting overall assignment plan is evaluated based on an objective function, such as $O(W,w,d)$, that represents the value of assigning a workload unit to a storage device given that a subset of the workload units is already assigned to the storage device. At least initially, the subset of workload units may be a null set. Typically, a bigger objective function value implies a better assignment. Given this formalization, it is now possible to design a system to solve the storage allocation problem.

Figure 1:
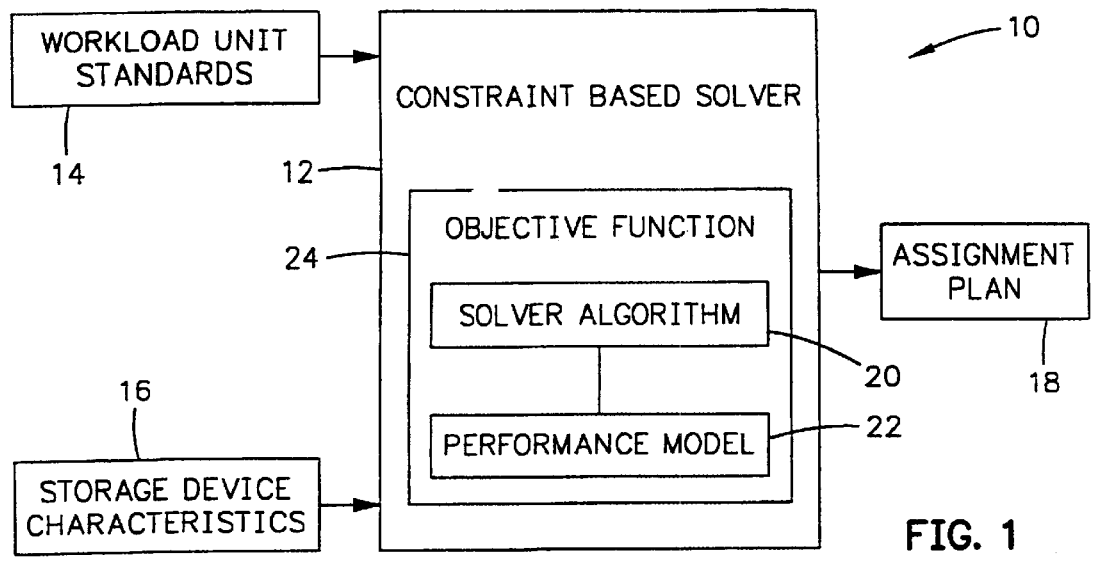
FIG. 1 is a block diagram of a computer storage constraint optimization system, in accordance with the invention.

Turning first to FIG. 1, a block diagram of a computer storage constraint optimization system 10, according to the present invention, is shown. System 10 includes a constraint based solver 12. Solver 12 takes as an input both workload unit standards 14 from a plurality of workload units (not shown) and storage device characteristics 16 from a plurality of storage devices (not shown) (the standards 14 and the characteristics 16 are referred to collectively as constraints) and generates as an output an assignment plan 18. Solver 12 accomplishes this through the operation of a solver algorithm 20 and a performance model 22 both of which are governed by at least one objective function 24. Solver algorithm 20 serves the functions of determining where to start, where to proceed with, and where to stop the assignment process. Performance model 22 serves the functions of determining if an assignment can be made and what resources are left if such an assignment is made. Objective function 24 guides the assignment process and evaluates the result. Recall from above that there may be multiple and competing objective functions 24. One of ordinary skill in the art will realize that system 10 shown may be implemented using software, hardware, or a dedicated signal processor (DSP).

Figure 2:
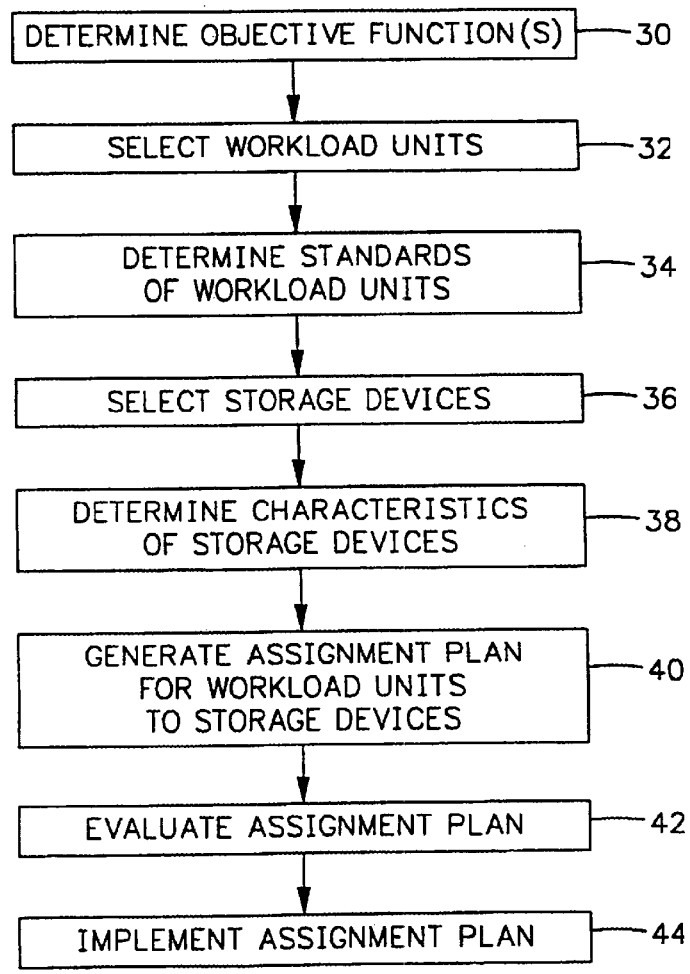
FIG. 2 is a flow diagram of a computer storage constraint optimization method, in accordance with the invention.

Turning now to FIG. 2, a flow diagram of a computer storage constraint optimization method is shown. The method assigns a plurality of workload units to a plurality of storage devices and begins with step 30. At step 30, at least one objective function is determined. Next, at step 32 one or more of the plurality of workload units is selected. Then, at step 34 the standards of the selected workload units are determined. At step 36, one or more of the plurality of storage devices is selected. Then, at step 38 the characteristics of the selected storage devices are determined. An assignment plan is generated for the workload units to the storage devices, in step 40. Next, at step 42 the assignment plan is evaluated either against some criteria such as the objective function or against some alternative plan. Finally, at step 44 the assignment plan is implemented if approved. One of ordinary skill in the art will realize that additional steps may be added to the method or that one or more of the steps may be repeated as necessary to generate an approved assignment plan.

A range of solutions is possible depending on what optimization heuristic is used to generate the assignment plan at step 40. A collection of heuristics will be presented below. They are generally organized into two groups. First, a set of well known heuristics are adapted to the storage allocation problem as formalized above. These are referred to here as the first-fit heuristic and its variants. One of ordinary skill in the art will readily identify other well known heuristics, such as simulated annealing, genetic algorithms, and linear relaxation, that could be adapted without departing from the spirit of the invention. In the interest of brevity, the first-fit heuristics are presented as examples of the plethora of well known heuristics that could be used. Second, a set of new heuristics, referred to here as the gradient based heuristic and its variants, will be disclosed. No one optimization heuristic is preferred above all the others. The choice depends on what constraints and objective functions are being considered.

The first collection of heuristics is based on the first-fit heuristic. The essence of the "simple" heuristic is to systematically assign each workload unit to the first storage device for which all of the constraints are satisfied, that is, the first device that it "fits" on. For example, assume that in a storage allocation problem, one is given a set of n workload units, $W=\{w_1, w_2, \ldots w_n\}$, and a set of m storage devices, $D=\{d_1, d_2, \ldots d_m\}$. According to the simple heuristic, one begins with workload unit $w_1$ and checks it first against storage device $d_1$ to see if it fits. If so, then $w_1$ is assigned to $d_1$. If not, then one checks to see if $w_1$ fits with $d_2$. If $w_1$ is such that it does not fit with any of the storage devices, then it is simply not assigned. This process is repeated until all of the workload units have been addressed or all of the storage devices are full. Implicit in this heuristic is that it acts to minimize the number of storage devices used in the assignment plan. One aspect of this heuristic is that it operates only on the most general form of constraints and not on consumable constraints as will be discussed below.

Since the simple first-fit heuristic described above is completely dependent on the order of the workload units and the storage devices, it is just as likely to find the worst assignment plan as it is the best. A first variant to the simple heuristic is to perform the heuristic multiple times with the order of the workload units or the storage devices changed and comparing the results of the different runs. Randomly shuffling the order of both the workload units and the storage devices between each run increases the odds that a good assignment plan will be found. Likewise, the more runs one performs, the better the odds are. However, in the interest of reaching a good assignment plan in a timely manner, either the number of runs or the amount of time for runs may be limited.

A second variant to the simple first-fit heuristic is to sort both the workload units and the storage devices before performing the heuristic. Carefully sorting the order of both the workload units and the storage devices increases the odds that a good assignment plan will be found. For example, sorting the workload units from largest size to smallest size tends to increase the chances that later workload units will fit into the space left over in the storage devices by the earlier assignments.

A third variant to the simple first-fit heuristic is to perform the heuristic using a more round robin approach to which of the storage devices is checked first. Instead of always first checking the first storage device $d_1$ with each new workload unit, the storage device that follows the storage device that received the previous assignment is checked first the next time. For example, assume that in the usual manner the first workload unit $w_1$ is assigned to a storage device $d_j$. Then, for the next workload unit $w_2$, one first checks the next storage device $d_{j+1}$ and works back to $d_j$ by wrapping around from the last storage device $d_n$ to the first $d_1$. Again, this process is repeated until all of the workload units have been addressed or all of the storage devices are full. Implicit in this variant is that it acts to evenly distribute the workload units over the storage devices used in the assignment plan. This third variant could also be used in combination with either of the previous two variants.

The second collection of heuristics originates from a gradient based heuristic. The first-fit heuristics produce assignment plans that satisfy the basic constraints, but they do not take into account the interplay between the different dimensions represented by the constraints. In order to balance the interplay, the gradient based heuristics combine the inequality constraints in different dimensions to formulate the assignment plan. A major development is to realize that any inequality constraint of the form $f(Wd)<C_d$, where $C_d$ is a constant that may depend on d and the function f is a monotonically non-decreasing function, can be thought of as consumable. Such a constraint can be said to be consumable because one can determine how much the addition of a workload unit to a storage device, with some workload units already assigned to it, will consume of that resource. The calculation of how much resource is consumed by the addition of workload unit w is trivial for a linear constraint, where the amount consumed is equal to $a_i w$. That is, the amount consumed can be determined by looking at workload unit w in isolation. For a non-linear consumable constraint however, the amount of resources consumed by the addition of workload unit w will depend on what subset of workload units W are already assigned to the storage device. It is pivotal to realize that the difference in resource usage between the storage device with and without the addition of workload unit w can be calculated and this difference can be used to treat non-linear consumable constraints as linear ones in any gradient function created for linear constraints. For example, the Toyoda gradient function will be adapted below.

According to the simple heuristic, one begins by calculating a set of first gradient functions for all of the workload units and all of the storage devices. Then, one determines which first gradient function has the greatest value and assigns the corresponding workload unit to the corresponding storage device. Next, one calculates a set of new gradient functions for the remaining workload units and all of the storage devices. Then, one determines which new gradient function has the greatest value and assigns the corresponding workload unit to the corresponding storage device. This process is repeated until all of the workload units have been addressed or all of the storage devices are full.

In general, the key to the gradient based heuristic is a non-negative gradient function G (W,w,d), that represents the value of assigning a workload unit w to a storage device d given that a subset of the workload units W is already assigned to the storage device. At least initially, the subset of workload units may be a null set. The gradient function is equal to zero if the assignment is infeasible. Typically, a bigger gradient function value implies a better assignment. A number of gradient functions are available.

A first gradient function according to the present invention is referred to as the cosine-gradient function. The theory is to represent the storage device as a point in vector space with dimensions that correspond to the remaining capacity of each of its consumable constraints. With respect to a particular storage device and the corresponding set of workload units assigned to it, a new workload unit can also be represented as a point in this vector space by plotting the amount of each consumable constraint that the workload unit would consume if it were to be assigned to the storage device. Ideally, one would like to find a set of workload units that fully utilizes all of the consumable constraints. One way that one can accomplish this is to assign workload units with opposite needs. For example, one can assign one workload unit with high capacity needs and low performance needs with a second workload unit with low capacity needs and high performance needs. Geometrically, this is equivalent to favoring assignments that minimize the angle of incidence between the storage device vector and the sum of the workload unit vectors for workload units on that storage device. Thus, if one takes the gradient function to be the cosine of the angle of incidence between the vector representing how much of each consumable constraint the workload unit would use if it were placed on the storage device, and the vector representing how much of each consumable constraint the storage device has available, then one obtains a gradient between zero and one such that larger gradient functions for the remaining workload units and all of the storage devices. Then, one determines which new gradient function has the greatest value and assigns the corresponding workload unit to the corresponding storage device. This process is repeated until all of the workload units have been addressed or all of the storage devices are full.

In general, the key to the gradient based heuristic is a non-negative gradient function G(W,w,d), that represents the value of assigning a workload unit w to a storage device d given that a subset of the workload units W is already assigned to the storage device. At least initially, the subset of workload units may be a null set. The gradient function is equal to zero if the assignment is infeasible. Typically, a bigger gradient function value implies a better assignment. A number of gradient functions are available.

A first gradient function according to the present invention is referred to as the cosine-gradient function. The theory is to represent the storage device as a point in vector space with dimensions that correspond to the remaining capacity of each of its consumable constraints. With respect to a particular storage device and the corresponding set of workload units assigned to it, a new workload unit can also be represented as a point in this vector space by plotting the amount of each consumable constraint that the workload unit would consume if it were to be assigned to the storage device. Ideally, one would like to find a set of workload units that fully utilizes all of the consumable constraints. One way that one can accomplish this is to assign workload units with opposite needs. For example, one can assign one workload unit with high capacity needs and low performance needs with a second workload unit with low capacity needs and high performance needs. Geometrically, this is equivalent to favoring assignments that minimize the angle of incidence between the storage device vector and the sum of the workload unit vectors for workload units on that storage device. Thus, if one takes the gradient function to be the cosine of the angle of incidence between the vector representing how much of each consumable constraint the workload unit would use if it were placed on the storage device, and the vector representing how much of each consumable constraint the storage device has available, then one obtains a gradient between zero and one such that larger gradient values, corresponding to smaller angles, imply better fits. So, the cosine-gradient function can be written as $$G(W,w,d)=(\overline{W}\cdot\overline{D})/(|\overline{W}||\overline{D}|) \qquad \text{Eq. (2)}$$

where W is the workload unit requirement vector and D is the storage device available vector. Experiments with the cosine-gradient function have generally provided acceptable results with the one exception being that consumable constraints with widely disparate ranges can skew the results to favoring one dimension or another.

A second gradient function according to the present invention is referred to as the normalized-cosine-gradient function. To address the skewing problem with the cosine-gradient function above, one can normalize the workload unit and storage device vectors so that the storage device vector is the unit vector. After normalization, one again takes the cosine of these two vectors to be the gradient function. So, the normalized-cosine-gradient function can be written as $$G(W,w,d)=((\overline{W}/\overline{D})\cdot(\overline{D}/\overline{D}))/(|\overline{W}/\overline{D}||\overline{D}/\overline{D}|) \qquad \text{Eq. (3)}$$

where $W/D=<w_1/d_1, w_2/d_2, \ldots w_n/d_n>$.

A third gradient function is an adaptation of the gradient function presented by Toyoda but extended to multiple "knapsacks" or storage devices and to consumable constraints. The Toyoda gradient function is based on two vectors $B=<b_1, b_2, \ldots b_k>$ and $F=<f_1, f_2, \ldots f_k>$, where k is the number of consumable constraints for a given problem. Each element $b_1$ of the vector B is the amount of a consumable resource 1 used by the subset of workload units W previously assigned to a particular storage device d divided by the total amount of that resource that that storage device started with. Each element $f_1$ of the vector F is the amount of a consumable resource 1 used by assigning a workload unit w to a particular storage device d divided by the total amount of that resource that that storage device started with. So, the Toyoda gradient function can be written as $$G(W,w,d)=(\sqrt{B \cdot B})/(B \cdot F) \quad \text{Eq. (4)}$$

It is important to note that Eq. (4) is undefined when no workload units are assigned, since B=<0, 0 ... 0> in the case where no workload units are assigned. In this case let B=<1, 1 ... 1>.

In addition to the range of solutions made possible by varying the optimization heuristic, an improved range of solutions is possible through the application of one or more objective functions. Any particular goal can be achieved by the computer storage constraint optimization method through the application of an objective function, O(W,w,d). For example, to generate an assignment plan that achieves a balanced loading of all of the storage devices, the objective function might be the expected fraction of unused bandwidth if workload units W and w were assigned to storage device d. With this objective function, the composite gradient function can be written as $$G'(W,w,d)=G(W,w,d)O(W,w,d) \quad \text{Eq. (5)}$$

where G(W,w,d) is either the cosine-gradient function or the normalized-cosine-gradient function outlined above. Thus, subject to balancing the fit of the various constraints of a storage device, minimizing the maximum percent of bandwidth used would be preferred. In practice, any objective function can be composited with the gradient functions to weight them for a particular goal as desired.

An extension of the Toyoda gradient function is to composite it with the objective function of supporting the greatest number of workload units on the cheapest set of storage devices. Then, the composite gradient function can be written as $$G'(W,w,d)=\text{maxcost}+(\text{benefit}(w)G(W,w,d))-\text{cost}(d) \quad \text{Eq. (6)}$$

where maxcost is the maximum cost of any storage device in the set of storage devices. In most cases, all of the workload units have an equal weight, so for all w, benefit(w) is equal to one. This gradient function has produced quite good assignment plans of workloads onto a low cost set of devices.

In practice, it was noted that the above extension of the Toyoda gradient function was favoring packing small size workload units onto storage devices before large size workload units. If one has a high disparity in workload unit sizes and one intends to assign all of the workload units, it is often better to assign the large size workload units first. To accomplish this, one need only invert the gradient function in Eq. (6). Then, the resulting composite gradient function can be written as $$G''(W,w,d)=\text{maxcost} \div (\text{benefit}(w)/G(W,w,d)-\text{cost}(d). \quad \text{Eq. (7)}$$

This gradient function has also given good assignment plans, especially in the case where the workload units have quite disparate sizes.

Through the variation of the optimization heuristic and the application of one or more objective functions, a full range of solutions is made possible. Given the speed of which assignment plans may be generated through the present invention, new opportunities present themselves. For example, rather than configuring a storage system only once, one can reconfigure it essentially at will. A new configuration can be generated every time a workload unit or a storage device is added or deleted. A new configuration can be generated to account for an important project like a new product release or a significant event like the end of the fiscal year. Through the use of empirical data feedback, a new configuration can be generated to better realize the original goals. Each of these new opportunities represents an improvement over the state of the art.

While the invention has been illustrated and described by means of specific embodiments, it is to be understood that numerous changes and modifications may be made therein without departing from the spirit and scope of the invention as defined in the appended claims.

What is claimed is:

1. A method of constraint optimization in a storage system having a plurality of workload units and a plurality of storage devices, said method comprising the steps of:

determining at least one objective function governing a non-linear performance model and a solver algorithm having a non-linear heuristic function;

selecting at least one workload unit from said plurality of workload units;

determining standards of said at least one workload unit;

selecting at least one storage device from said plurality of storage devices;

determining characteristics of said at least one storage device;

generating an assignment plan for said at least one workload unit to said at least one storage device based on said at least one objective function; and evaluating said assignment plan against said at least one objective function; wherein said step of generating an assignment plan comprises assigning said at least one workload unit to said at least one storage device when said non-linear heuristic function is maximized, wherein said nonlinear heuristic function comprises at least one of a cosine-gradient function, a normalized-cosine-gradient function, a Toyoda adaptation gradient function, and a composite gradient function; and wherein said step of generating an assignment plan further comprises:

calculating a set of first gradient functions for said plurality of workload units and said plurality of storage devices;

determining which of said set of first gradient functions has the greatest value;

assigning, based on said determining step, a workload unit of said plurality of workload units to a storage device of said plurality of storage devices;

recalculating a set of new gradient functions for remaining workload units of said plurality of workload units and remaining storage devices of said plurality of storage devices;

redetermining which of said set of new gradient functions has a greatest value;

reassigning, based on said redetermining step, another workload unit of said plurality of workload units to another storage device of said plurality of storage devices; and repeating said recalculating, redetermining, and reassigning steps.

2. A computer readable memory that can be used to direct a computer to perform non-linear constraint optimization in a storage system having a plurality workload units and a plurality of storage devices, said non-linear constraint optimization comprising the steps of:

determining at least one objective function governing a non-linear performance model and a solver algorithm having a non-linear heuristic function;

selecting at least one workload unit from said plurality of workload units;

determining standards of said at least one workload unit;

selecting at least one storage device from said plurality of storage devices;

determining characteristics of said at least one storage device;

generating an assignment plan for said at least one workload unit to said at least one storage device based on said at least one objective function; and evaluating said assignment plan against said at least one objective function wherein said step of generating an assignment plan comprises assigning said at least one workload unit to said at least one storage device when said non-linear heuristic function is maximized, wherein said non-linear heuristic function comprises at least one of a cosine-gradient function, a normalized-cosine-gradient function, a Toyoda adaptation gradient function, and a composite gradient function; and wherein said step of generating an assignment plan further comprises:

calculating a set of first gradient functions for said plurality of workload units and said plurality of storage devices;

determining which of said set of first gradient functions has the greatest value;

assigning, based on said determining step, a workload unit of said plurality of workload units to a storage device of said plurality of storage devices;

recalculating a set of new gradient functions for remaining workload units of said plurality of workload units and remaining storage devices of said plurality of storage devices;

redetermining which of said set of new gradient functions has a greatest value;

reassigning, based on said redetermining step, another workload unit of said plurality of workload units to another storage device of said plurality of storage devices; and repeating said recalculating, redetermining, and reassigning steps.

* * * * *